United States Patent [19]

Stehlicek et al.

[11] 4,038,470
[45] July 26, 1977

[54] METHOD FOR PREPARATION OF POLYMERS WHICH CONTAIN N-ACYLLACTAM GROUPS

[75] Inventors: Jaroslav Stehlíček; Jan Šebenda, both of Prague, Czechoslovakia

[73] Assignee: Ceskoslovenska akademie ved, Prague, Czechoslovakia

[21] Appl. No.: 667,943

[22] Filed: Mar. 18, 1976

[30] Foreign Application Priority Data

Mar. 20, 1975  Czechoslovakia .................. 1901/75

[51] Int. Cl.² .......................... C08F 8/00; C08F 8/18; C08F 8/26; C08F 8/40
[52] U.S. Cl. ........................................ 526/29; 526/16; 526/19; 526/21; 526/27; 526/46; 526/50
[58] Field of Search ........................ 526/29, 27, 46, 50

[56] References Cited

U.S. PATENT DOCUMENTS

| 3,544,541 | 12/1970 | Edwards et al. | 526/29 |
| 3,833,633 | 9/1974 | Owen et al. | 526/29 |

Primary Examiner—William F. Hamrock

[57] ABSTRACT

The invention relates to the method for preparation of polymers containing N-acyllactam groups which are suitable as polymeric activators of anionic polymerization of lactams to obtain graft copolymers or block copolymers of the AB or ABA type, where A is the polyamide block. The polymers of the general formula I

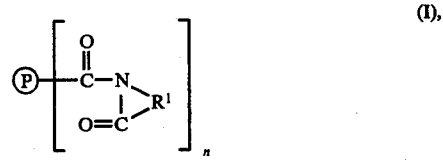

wherein $R^1$ is a bifunctional aliphatic $C_2 - C_{15}$ hydrocarbon residue, $n$ is an integer and ⓟ is a n-functional linear, branched or crosslinked polymeric residue, are prepared by the reaction of polymeric acyl halides of the general formula II

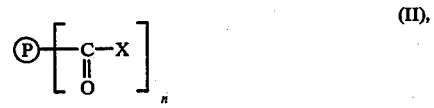

where X = Cl or Br, with 1 – 5 mole of trisubstituted N-silyllactam, e.g. N-trimethylsilyllactams or N-phenyldimethylsilyllactams, per one equivalent of acyl halide group in an inert solvent at −15 to +100° C (preferably 0° to +30° C). The polymeric acyl chlorides (the general formula II, X = Cl) are advantageously prepared from polymers containing carboxylic groups and 1 – 5 moles of $PCl_5$ per one equivalent of carboxylic groups at −15° C to +100° C, preferably at 0° C to +30° C.

4 Claims, No Drawings

METHOD FOR PREPARATION OF POLYMERS WHICH CONTAIN N-ACYLLACTAM GROUPS

The invention relates to the method for preparation of polymers which contain N-acyllactam groups by modification of polymers containing carboxylic or acyl halide groups.

Polymers carrying acylating or carbamoylating groups at the end of their main chain or in side chains are known to be used as activators in anionic polymerization of lactams (O. Wichterle and V. Gregor: J. Polymer Sci. 1959, 34, 309; M. J. Owen and J. Thompson: J. Polymer Sci;, Chem. Ed. 1973, 11, 453; Y. Yamashita, H. Matsui and K. Ito: J. Polymer Sci., Chem. Ed. 1972, 10, 3577; W. L. Hergenrother and R. J. Ambrose: J. Polymer Sci., Part B, 1972, 10, 679). In this way, graft copolymers with polyamide grafts or block copolymers of the AB or ABA type with polyamide blocks A are formed.

Polymeric activators may be prepared from monomers which contain the functional group of an activator, or by application of an initiator or a chain-transfer agent carrying such functional group in the radical polymerization, or by modification of reactive groups of the polymer (e.g. of —OH, —COOH, or —NH$_2$ groups, or C-anions) to functional groups possessing the activation effect.

With respect to the recent knowledge of the mechanism of anionic polymerization of lactams, namely, concerning the mechanism of decay and regeneration of growth centers, the polymeric activators which contain N-acyllactam functional groups may be considered the most suitable ones. These functional groups represent directly the growth centers of polyamide chain and the product should not contain larger amounts of any of the possible homopolymers if the polymerization has been carried out under mild conditions.

This requirement is not met if the reactive groups of the polymeric activator are only precursors of growth centers, as they are, for example, in the case of isocyanate, chloroformate, acylurea, ester, and other groups.

The choice of monomers, radical initiators and chain-transfer agents which contain the N-acyllactam group in their molecule is rather limited. In addition, N-acyllactams are readily hydrolysed and solvolyzed by alcohols and undergo condensation reaction in the presence of bases in an anhydrous medium. This fact further limits the selection of polymerization conditions for the preparation of polymers which contain this kind of functional group. On the other hand, numerous methods are known for the preparation of various polymers and copolymers which contain carboxylic groups and which could prove suitable for modification by polymeranalogous reactions yielding polymers containing N-acyllactam groups.

The polymers containing carboxylic groups may be prepared above all by polymerization and copolymerization of vinyl carboxylic acids, e.g. acrylic, methacrylic, 4-vinylbenzoic, maleic, fumaric, and other acids or their anhydrides, e.g. maleic anhydride, or by polycondensation reactions of polyfunctional acids. The polymers with terminal carboxylic groups are prepared, for example, from "living anionic polymers, the terminal anions of which are deactivated with carbon dioxide. Another method of preparation employs 4,4'-azobis- (4-cyanopentanoic acid), succinyl peroxide, glutaroyl peroxide, and the like as initiators or radical polymerization, or halogenoacids (e.g. dithiobutyric acid) as chain-transfer agents. It is further possible to introduce carboxylic groups by reactions of the prepared polymers, e.g. by Friedel-Crafts acetylation of phenyl groups of polystyrene and the subsequent oxidation of acetophenone groups formed. All mentioned methods are industrially employed in manufacturing of ion-exchange resins, liquid rubber, raw materials for paints and varnishes, additives increasing affinity to dyes and suppressing electrostatic charges of synthetic fibers, etc.

In selecting the polymeranalogous reactions which should provide N-acyllactam groups and choosing the reaction conditions, one cannnot directly apply the knowledge about syntheses of low-molecular-weight N-acyllactams. Groups bonded to a polymeric chain usually exhibit a reactivity different from the reactivity of low-molecular-weight analogs and the concentration of groups bonded to a polymer is very low. The latter fact lowers the reactive velocity in the reaction of terminal groups of a polymer because on account of the nonreactive residue of the macromolecule, the concentrations of reacting groups which are usual in low-molecular-weight syntheses are not possible. Not only the low concentration of the reacting component decreases the reaction rate but this factor may also lead to the larger or even preferential formation of reaction products which are present as byproducts in the synthesis of the low-molecular-weight analogs (e.g. by cyclization). Another limitation is due to different ways of isolation and purification of products. While low-molecular-weight compounds may be distilled off or separated by crystallization from polymeric (tarry) byproducts, the high-molecular-weight product cannot be so separated from by products of the similar character and may be purified only according to different solubilities by extraction or precipitation. The chosen reactions have to proceed quantitatively to provide an activator without acidic groups which would inhibit the anionic polymerization.

At present, we have found the method for preparation of high-molecular-weight N-acyllactams by modification of polymers containing carboxylic groups, which method meets the aforesaid requirements, i.e. it enables the quantitative conversion of carboxylic groups into N-acyllactam groups and isolation of the pure polymeric product.

An objective of this invention is the method for preparation of polymers, containing N-acyllactam groups, of the general formula I

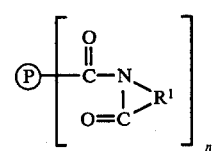

where R$^1$ is a bifunctional aliphatic hydrocarbon residue containing 2 to 15 carbon atoms, which can be either linear or branched, $n$ is an integer, and Ⓟ is a n-functional polymeric residue, which can be linear, branched or can be a part of a three-dimensional network, which method consists in reaction of polymers containing acyl halide groups of the general formula II

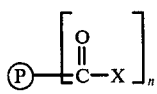  (II)

where N and Ⓟ have the above given meaning and X is Cl or Br, with 1 to 5 molar parts of the corresponding trisubstituted N-silyllactam, related to 1 equivalent part of acyl halide groups, of the general formula III

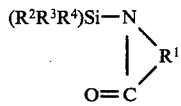  (III), where $R^1$ has the above given meaning and $R^2$, $R^3$ and $R^4$ are the same or different alkyl or aryl groups containing 1 to 7 carbon atoms, in an inert solvent at the temperature $-15°$ C to $+100°$ C, preferably at the temperature $0°$ C to $+30°$ C. N-Trimethylsilyllactams of the general formula IV

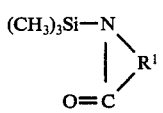  (IV)

where $R^1$ has the above given meaning, ar advantageously used as the aforesaid trisubstituted N-silyllactam.

According to this invention, an acyl chloride prepared by the reaction of a polymer which contains carboxylic groups with 1 to 5 molar parts of phosphorus pentachloride, related to 1 equivalent part of carboxylic groups of the polymer, at the temperature $-15°$ C to $+100°$ C, preferably at the temperature $0°$ to $+30°$ C, is advantageously used as the polymeric acyl halide. However, the polymeric acyl chloride can be prepared also in other ways, provided that no byproducts which cannot be separated are formed, e.g. by heating of the polymer which contains carboxylic groups with an excess of thionyl chloride, or by its reaction with $PCl_3$, or by transacylation with a low-molecular-weight acyl chloride, as e.g. acetyl chloride, or by copolymerization of a fundamental monomer or a mixture of monomers with a monomeric acyl chloride, e.g. 4-vinylbenzoyl chloride or acryloyl chloride, or by termination of the "living" polymeric anion with phosgene.

Trisubstituted N-silylactams can prepared by reaction of the corresponding lactam with trisubstituted silyl chloride, e.g. with trimethylsilyl chloride or phenyldimethylsilyl chloride, in the way described, for example, by M. Rothe and T. Toth (Chem. Ber. 1966, 99, 3820). Lactams used for this purpose have 3 to 16 carbon atoms in the lactam ring and may be once or several times substituted at the carbon atoms of the ring with alkyl groups, as are e.g. 2-pyrrolidone, caprolactam caprylolactam, enantholactam, dodecanolactam, γ-methylcaprolactam, α, α-dimethylacaprolactam, ε-ethylcaprolactam, 3-propyl-2-azetidinone, and the like.

The reaction of N-(trimethylsilyl) lactams with low-molecular-weight acyl chlorides was used in preparations of aminoacyllactams (M. Roth, T. Toth: Chem. Ber. 1966, 99, 3820), where the protective group of the aminoacid remained unchanged, N-acyl-β-lactams (H. R. Kricheldorf: Makromol. Chemie 1973, 170, 89), where other acylation methods failed, and recently, azobis (N-acyllactams) (Czechoslovak Patent Application PV 1410- -75), where very mild conditions are required for the synthesis. At present, it has been found that trisubstituted N-silyllactans are, according to this invention, suitable for preparation of high-molecular-weight N-acyllactams because their reaction with acyl halide groups is quantitative and unambiguous and the resulting low-molecular-weight products can be readily removed by evaporation in vacuum or by extraction. The reaction proceeds under conditions, such that other reactive sites of the polymer, e.g. double bonds, ester or amide groups, and others, remain untouched.

The following examples illustrate the method of preparation according to this invention, but they by no means limit the objective of the invention to the procedures and compounds mentioned there.

EXAMPLE 1

The telechelic polystyrene, which was prepared by radical polymerization initiated with 4,4'-azobis -azobis(4-cyanopentanoic acid) and contained $89.3 \times 10^{-6}$ equiv. —COOH/g (the number average molecular weight 22,400) was dissolved in the amount of 2.0 g in 10 ml of carbon tetrachloride and 42 mg of phosphorus pentachloride was added to the prepared solution. The mixture was stirred at the ambient temperature (20° C) for 5 hours and all $PCl_5$ dissolved during this time. The solution was then evaporated to dryness in vacuum and the residue was dissolved in 10 ml of dry benzene and evaporated again. This procedure was repeated twice more, always with 10 ml of benzene. The resulting polystyrene-bis-(acyl chloride) was dissolved in 10 ml of dry benzene, the solution was cooled to 0° C and 42 mg of N-trimethylsily caprylolactam was added under stirring. The reaction mixture was stirred for 1 hour at 0° C, then for 4 hours at 20° C, and, eventually, it was allowed to stand for 10 hours at 20 - 5° C. The reaction solution was precipitated into methanol. The precipitated polymer was filtered off, washed with methanol and dried for 24 hours at 35° C and 65 Pa 1.9 g of polystyrene was obtained which contained $92 \times 10^{-6}$ equivalents of N-acylcaprylolactam groups per gram and did not contain a determinable amount of —COOH and —COCl groups according to the differential infrared spectroscopy.

EXAMPLE 2

The telechelic polystyrene was prepared by anionic polymerization with disodium tetra (α-methylstyrene) and carbonization of the "living" polymer with dry carbon dioxide and contained $122 \times 10^{-6}$ equiv. —COOH per gram (the number average molecular weight 8200). This polymer (2 g) was dissolved in 10 ml of carbon tetrachloride (dried over molecular sieves) and 60 mg of $PCl_5$ was added at the ambient temperature (20° C). The reaction mixture was stirred with exclusion of moisture for 2 hours at 20° C and then 2 hours at 40° C. All $PCl_5$ dissolved during the first hour. The solution was evaporated in vacuum to dryness and the residue was twice dissolved in 10 ml of dry benzene and evaporated to vacuum. The resulting polystyrene-bis-(acyl chloride) was dissolved in 10 ml of dry toluene and 59 mg of N-trimethylsilylcaprolactam were added to this solution at the ambient temperature (20° C) with stirring. The mixture was stirred for 1 hour and then allowed to stand for 12 hours at 0° - 5° C. Then, it was evaporated to dryness, the residue was dissolved in 5 ml of toluene and the solution was precipitated into methanol. After filtration, washing with methanol and drying, 2.0 g of polystyrene were obtained which contained $124 \times 10^{-6}$ equiv. of N-acylcaprolactam groups per gram. This value was obtained by aminolysis of the terminal acyllactam groups with benzylamine and determination of caprolactam by gas-liquid chromatography. Infrared spectra of the product confirm the absence of —COOH and —COCl groups.

EXAMPLE 3

The telechelic poly (α-methylstyrene), which was prepared by anionic polymerization with dilithium diphenylmethane and reaction of the "living" polymer with phosgene, contained 48.2 equiv. —COCl groups per gram of the polymer (the number average molecular weight 20,750). This polymer (2 g) was dissolved in 15 ml of absolute $CCl_4$, the solution was cooled to 0° C, and 35 mg of N-trimethylsilyldodecanolactam were added under stirring. The reaction mixture was stirred for 3 hours at 0° C and then allowed to stand for 12 hours at 0° –5° C. The solution was evaporated to dryness, dissolved in 5 ml of benzene and precipitated into methanol. After filtration, washing and drying, 1,9 g of polymer was obtained which contained $46.5 \times 10^{-6}$ equiv. of N-acyldodecanolactam groups per gram and no —COCl groups as determined by means of the differential infrared spectroscopy.

EXAMPLE 4

The telechelic copolymer, which was prepared by copolymerization of isoprene and styrene, at the initial molar ratio of 5 : 1, initiated with 4,4'-azobis(4-cyanopentanoic acid) and the subsequent selective hydrogenation of isoprene 1,2- and 1,4- units, contained $387 \times 10^{-6}$ equiv. —COOH /g (the number average molecular weight 5170). This copolymer (1 g) was dissolved in 15 ml of dry carbon tetrachloride and 82 mg of $PCl_5$ were added to this solution at 20° C with stirring. During 2 hours at 20° C, all of the $PCl_5$ dissolved. The solution was then evaporated to dryness in vacuum and the residue was twice dissolved in 15 ml of benzene and evaporated in vacuum. The residue was dissolved in 15 ml of benzene and 30 mg of N-trimethylsilyl-2 -pyrrolidone were added with stirring at 20° C. The mixture was allowed to stand for 24 hours at 0 – 5° C and then evaporated to dryness in vacuum. A copolymer (0.92 g) was obtained which contained $374 \times 10^{-6}$ equiv. of N-acyl-2-pyrrolidone groups per gram.

EXAMPLE 5

Commercial polybutadiene (1 g) containing about $0.9 \times 10^{-3}$ equiv. of —COOH groups in 1 g (Butarez CTL) was dissolved in 20 ml of dry $CCl_4$ and 0.210 g of $PCl_5$ was added to this solution, which was then stirred at 25° C for 1 hour. The $PCl_5$ dissolved during this time. The solution was then evaporated to dryness in vacuum and then twice dissolved in 10 ml of dry benzene and evaporated. The residue dissolved in 10 ml of dry toluene, the solution was cooled to o° C and 0.240 g of N-trimethylsilylcaprolactam was added with stirring. The mixture was stirred for 1 hour at 0° C, allowed to stand for 12 hours at 0° – 5° C, evaporated in vacuum and the residue was dissolved in benzene and again evaporated. The resulting viscous oil was extracted with methanol, dissolved in benzene and evaporated in vacuum. The obtained polymer (0.95 g) contained $310 \times 10^{-6}$ equiv. of N-acylcaprolactam groups per gram and no —COOH and —COCl groups according to the differential infrared spectroscopy.

EXAMPLE 6

The ternary copolymer, prepared by radical copolymerization of styrene, 4-vinylbenzoic acid, and methyl methacrylate at the initial molar ratio 8:1:1, contained $768 \times 10^{-6}$ equiv. of —COOH groups per gram. To a solution of 2 g of this copolymer in 30 ml of dry $CCl_4$ was added 0.325 g of $PCl_5$ and the mixture was stirred for 4 hours at 20° C. All of the $PCl_5$ was transferred into solution during this time. The reaction solution was then evaporated to dryness in vacuum and three times sucesssively dissolved in 20 ml of $CCl_4$ and evaporated. The residue was dissolved in 20 ml of dry $CCl_4$, cooled with stirring in a water-ice bath and 0.400 g of N-trimethylsilyl- γ-methylcaprolactam was added to the cold solution at once with stirring. The mixture was stirred at 0° C for 1 hour, then at 20° C for 4 hours, and, eventually, evaporated to dryness in vacuum. The residue was dissolved in 15 ml of toluene and precipitated into methanol. After filtration, washing and drying, 1.9 g of terpolymer was obtained which contained $760 \times 10^{-6}$ equiv. of N-acyl- γ-methylcaprolactam groups per gram according to determination by aminolysis and gas-liquid chromatography. Infrared spectra proved the absence of —COOH and —COCl groups.

EXAMPLE 7

Acetyl groups introduced into the aromatic nuclei of a styrene - divinylbenzene bead copolymer (the average particle size 200 μm, 2% of the crosslinking agent) by the Friedel-Crafts acetylation. The subsequent oxidation of acetophenone units with potassium hypobromite gave a product which contained $1.52 \times 10^{-3}$ equiv. —COOH/g. Thionyl chloride (10 ml) was added to a suspension of 3 g of dry beads of this copolymer in 60 ml of dry benzene and the suspension was heated for 5 hours at 60° – 65° C with stirring. The copolymer was isolated by filtration, washed five times with 50 ml portions of dry benzene and dried in vacuum. The resulting polymeric acyl chloride was dispersed in 60 ml of dry toluene, the suspension was cooled to 0° C and 2.00 g of N-(phenyldimethylsilyl) caprolactam were added. The reaction mixture was stirred for 6 hours at 25° C, the copolymer was then filtered, washed with benzene, methanol, water, methanol, and ether and dried in vacuum. The determination phase from aminolysis and gas-liquid chromatography of the soluble phase from aminolysis showed $1.43 \times 10^{-3}$ equiv. of N-acylcaprolactam groups in 1 g of the copolymer.

We claim:
1. Method for preparation of polymers containing N-acyllactam groups of the general formula I

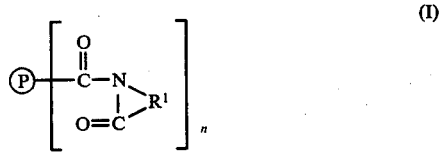

where $R^1$ is a bifunctional aliphatic hydrocarbon residue containing 2 to 15 carbon atoms, which may be linear or branched n is an integer and (P) is a n-functional polymeric residue, which may be linear, branched or can form the part of a threedimensional network, wherein the polymers containing acyl halide groups of the general formula II

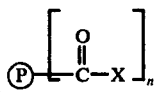   (II)

where $n$ and ⓟ have the above given meaning and X is Cl or Br, are subjected to the reaction with a trisubstituted N-silylactam of the general formula III

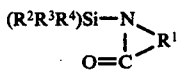   (III)

where $R^1$ has the above given meaning and $R^2$, $R^3$ and $R^4$ are the same or different alkyl or aryl groups containing 1 to 7 carbon atoms, in an inert solvent at the temperature $-15°$ C to $+100°$ C, preferably at the temperature $0°$ C to $+30°$ C, while 1 to 5 molar parts of the trisubstituted N-silyllactan is used per one equivalent of acyl halide groups of the polymer.

2. Methods as set forth in the claim 1, wherein polymeric acyl chloride is used as the polymer containing acyl halide groups, which is prepared by reaction of a polymer containing carboxylic groups with 1 to 5 molar of phosphorus pentachloride per one equivalent of carboxylic groups of the latter polymer at the temperature $-15°$ C to $+100°$ C, preferably at the temperature $0°$ C to Y+30° C.

3. Method as set forth in the claim 1, wherein N-trimethylsilyllactam of the general formula IV

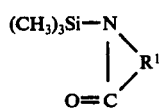   (IV)

where $R^1$ has the above given meaning, is used as the trisubstituted N-silyllactam.

4. A method as set forth in claim 1, wherein the acyl halide group-containing polymer of the general formula II comprises the reaction product of a carboxylic groupcontaining polymer and phosphorus pentachloride in the ratio of 1 to 5 molar parts of the latter per equivalent of carboxylic groups of the former.

* * * * *